May 5, 1925.
J. EATON
1,536,830
SYSTEM AND SWITCH FOR CONTROLLING ELECTRIC TRANSLATING DEVICES
Filed Sept. 6, 1922
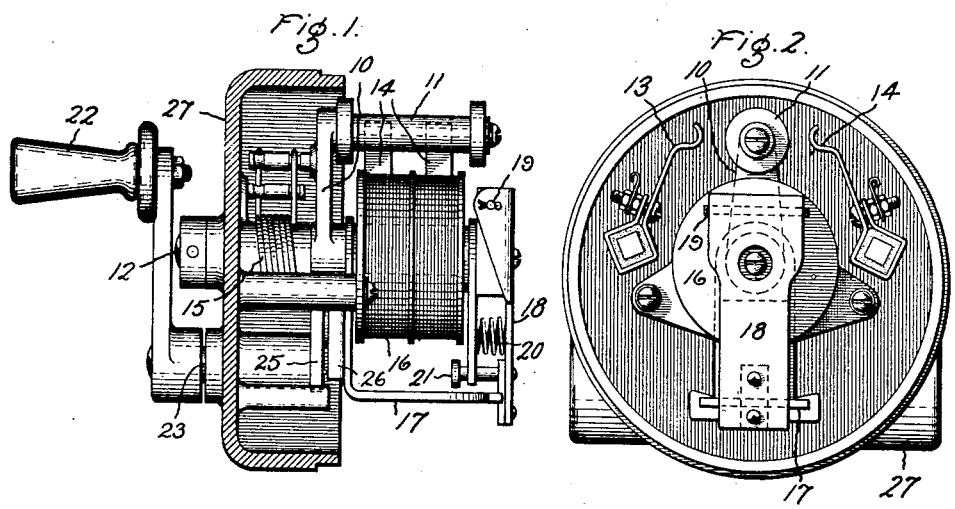
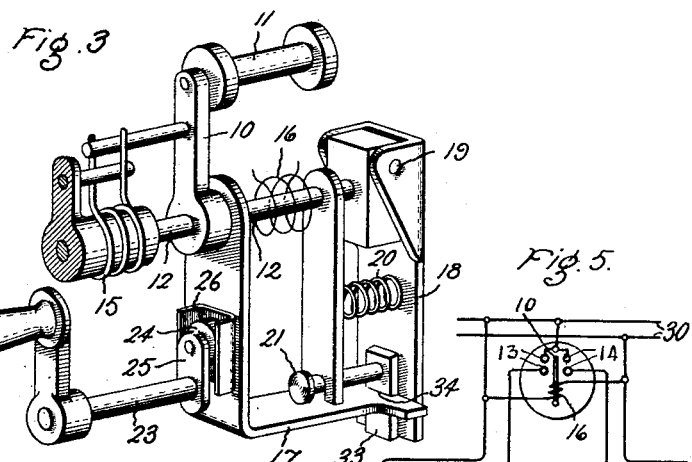
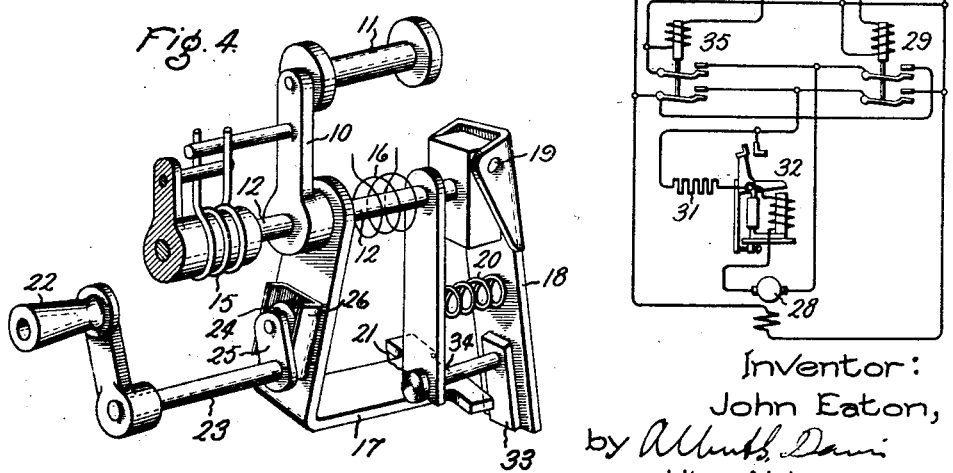
Inventor:
John Eaton,
by Albert D. Davis
His Attorney, Patented May 5, 1925.

1,536,830

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

SYSTEM AND SWITCH FOR CONTROLLING ELECTRIC TRANSLATING DEVICES.

Application filed September 6, 1922. Serial No. 586,552.

*To all whom it may concern:*

Be it known that I, JOHN EATON, a subject of the British Empire, residing at Schenectady, county of Schenectady, State of New York, have invented certain new and useful Improvements in Systems and Switches for Controlling Electric Translating Devices, of which the following is a specification.

My invention relates to improvements in systems and switches for controlling electric translating devices, and one of the objects of the invention is to provide a system of control involving a simple, inexpensive and effective control switch which may be manually or otherwise operated under normal conditions, and when abnormal circuit conditions occur, as for example a failure of voltage, the switch is automatically prevented from being operated, or if operated while the circuit conditions are normal and the circuit conditions become abnormal, the switch is automatically returned from its operated position and cannot be again operated until the circuit conditions again become normal.

A further object of the invention is to provide a simple, inexpensive and effective arrangement involving a connection, between the circuit controlling switch mechanism and the means for operating the switch, which is under the control of an electromagnet which is energized responsively to the conditions in the circuit controlled by the switch.

A specific object of the invention is to provide an improved control switch which may be used as a master controller and operate in the same manner as master controllers ordinarily provided as long as the circuit conditions are normal, but which is prevented from being operated in case the circuit conditions are abnormal and which is automatically opened and retained in the open position when the circuit conditions are abnormal.

The construction and operation of a system of control and a switch built in accordance with my invention, and the novel features, will be more fully described in connection with the accompanying drawings, and definitely indicated in the appended claims.

Fig. 1 is a part sectional view of a switch embodying my improvements; Fig. 2 is a rear view of the switch shown in Fig. 1; Fig. 3 is a skeleton view or diagram by means of which I shall describe the operation of my switch; Fig. 4 is a view similar to Fig. 3, showing the relative positions which the parts of the switch assume when the voltage fails; and Fig. 5 is a very simplified diagram of a system for the control of an electric motor in accordance with the invention.

Referring to the drawings the switch member 10 having the contact 11 secured thereto, is secured to the shaft 12 so as to rotate therewith. The switch member is biased to the mid position out of engagement with the sets of stationary contacts 13 and 14 by means of the coiled spring 15. The switch is provided with a controlling electromagnet comprising a winding 16 mounted on the shaft 12, a magnet structure 17 and an armature 18 cooperating therewith. The armature 18 is connected to the shaft 12 so as to rotate therewith, and the armature is pivotally mounted with respect to the shaft at 19 so as to be movable into and out of operative engagement with the end of the magnet structure 17. The spring 20 is provided for normally biasing the armature out of engagement with the end of the magnet structure 17, and the stop pin 21 is provided for limiting the movement of the armature to the unattracted position. The electromagnet, with its magnet structure and armature, is adapted to form an operating connection between the handle 22 and the switch member. This handle is connected to a shaft 23 and the roller 24 on the arm 25 cooperates with the guide 26 mounted on the magnet structure 17, so as to rotate the magnet structure about the shaft 12 as an axis. The handle is thus mechanically locked in an operative position when operated thereto, by reason of the fact that the tendency of the switch member to return the handle to the neutral position is taken up by the side thrust on the shaft 23. The various parts of the switch are mounted in a casing 27.

As thus constructed and arranged, the operation of my invention is as follows:

Let it be assumed that the magnet winding 16 is energized and that the switch member 10 is in the mid position as shown in Figures 1, 2, 3 and 5. In order to start the electric motor 28 for the forward direction of operation, the handle 22 is turned in the counter clockwise direction so as to move the switch member 10 clockwise to bring the contact 11 into engagement with the stationary contact 14, thereby energizing the line contactor 29 and connecting the motor to the source of supply 30 with the starting resistor 31 included in the motor armature circuit. When the motor accelerates and the current taken by the motor drops to the predetermined value, the electromagnetic switch 32 of the series lockout type will close thereby short-circuiting the starting resistor 31 and connecting the motor armature directly to the source of supply. In case the supply voltage should fail, the winding 16, of the electromagnet will be de-energized and the armature 18 will move to the unattracted position in accordance with the bias of the spring 20, thereby breaking the operating connection between the handle 22 and the switch member 10. The switch member 10 and contact 11 will be returned to the mid position between the sets of stationary contacts 13 and 14, by the action of spring 15 and the various parts of the switch will be in their respective positions as shown in Figure 4. In case the supply voltage is restored, the winding 16 of the electromagnet will be again energized and the armature 18 attracted to the magnet structure 17, but the contact 11 will not be returned into engagement with either of the sets of stationary contacts until after the handle 22 is returned to the mid position so that the catch 33 can enter the notch 34 in the end of the magnet structure 17. When the handle has been thus moved, the operating connection between the switch member and the handle is restored and the switch may be operated by means of the handle in the same manner as if the switch member were directly secured to the shaft 23 on which the handle 22 is mounted. In order to energize the motor for operation in the reverse direction the handle is turned in the clockwise direction, thereby moving the switch contact 11 into engagement with the set of stationary contacts 13. The electromagnetic line contactor 35 is thus energized to connect the motor armature to the source of supply for operation in the reverse direction and the accelerating contactor 32 will function as before to short-circuit the starting resistor 31 when the motor has accelerated and the current taken by the motor armature has dropped to the predetermined value.

It will be seen that in case the voltage of the supply circuit 30 has failed, there will be no operating connection between the handle 22 and the switch member 10 so that the switch contacts cannot be closed initially unless power is ready to be supplied from the supply circuit. It will also be noted that the switch is capable of operation as a master switch in the ordinary manner when the supply circuit conditions are normal, but in case the supply circuit conditions become abnormal, the switch member of the switch is automatically returned to its open position, and cannot be moved to a circuit closing position until the supply circuit conditions again become normal.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:—

1. A control switch comprising a switch member biased to one position, an armature operatively connected to said switch member, an electromagnet having a magnet structure relatively movable with respect to the switch member to a position corresponding to the biased position of the switch member to attract said armature to said magnet structure and initially form an operating connection between the magnet structure and the switch member only in the off position of the switch member when the magnet winding is energized, and means for moving said magnet structure to operate said switch member to a second position while the said magnet winding is energized.

2. A control switch comprising a movable switch member biased to one position, a relatively movable operating member for the switch member, an electromagnet, having an armature biased to the unattracted position operatively connected to one of said members and a magnet structure operatively connected to the other of said members, forming an operating connection between the said members for moving the switch member to a second position and for magnetically holding the same in the second position when the magnet winding is energized and the said armature is in its attracted position, an operating handle, and an operating connection between the said handle and the said magnet structure for mechanically holding the switch member in the second position as long as the said electromagnet is energized.

3. A control switch comprising a rotatable switch member biased to one position, a relatively movable rotatable operating member for the switch member, an electromagnet having an armature biased to the unattracted position, the said armature being hingedly connected to the switch member and arranged to rotate therewith, and a magnet structure for the switch member rotatably mounted for relative movement with the said operating member, the said electromagnet forming an operating connection between the operating member and the switch member through the said armature and the said magnetic structure for moving the switch member to a second position and for magnetically holding the same in the second position while the magnet winding is energized.

4. A control switch comprising a rotatable switch member biased to one position, an electromagnet having a magnet structure mounted coaxially with the switch member and having relative rotation therewith, and an armature for the said electromagnet mechanically connected to the switch member and movable into locking engagement with the said magnet structure when the magnet winding is energized for rotating the switch member to a second position and for magnetically holding the switch member in the second position while the magnet winding is energized.

5. A control switch comprising a rotatable switch member biased to a mid-position between two operative positions, a shaft to which the switch member is secured, an electromagnet having a magnet structure mounted for rotation about the said shaft, and an armature biased to the unattracted position secured to the said shaft for interlocking with the said magnet structure when in the attracted position to move the switch member to either of said operative positions and magnetically hold the same therein while the magnet winding is energized, and manually operated means for rotating the said magnet structure about the said shaft.

6. The combination in an electric switch of a switch member biased to one position, a shaft on which the switch member is mounted, an electromagnet having a winding disposed on the said shaft, a magnet structure mounted to rotate on the said shaft, an armature hingedly connected with the said shaft and biased to the unattracted position, the said armature when in the attracted position initially forming a mechanical locking connection between the said magnet structure and the said shaft only in the off position of the switch member, the said connection being maintained during movement of said magnet structure while the said winding is energized, whereby operating the said magnet structure moves the switch member from its biased position to an operative position and the switch member is maintained by the said electromagnet in the operative position as long as the said winding is energized.

In witness whereof, I have hereunto set my hand this 5th day of September, 1922.

JOHN EATON.